United States Patent [19]

Tworek et al.

[11] 4,309,245
[45] Jan. 5, 1982

[54] PROCESS FOR MANUFACTURING BORON NITRIDE FIBER FELT USING A FOURDRINIER MACHINE

[75] Inventors: John L. Tworek, West Seneca; Gordon R. Rignel, Clockport, both of N.Y.

[73] Assignee: Kennecott Corporation, Stamford, Conn.

[21] Appl. No.: 134,903

[22] Filed: Mar. 28, 1980

[51] Int. Cl.³ .............................................. D21H 5/18
[52] U.S. Cl. .................................... 162/102; 162/146; 162/157 R; 162/201; 162/206; 162/207; 264/65; 264/319; 264/332
[58] Field of Search .................. 162/146, 157 R, 201, 162/206, 207, 152, 102; 423/290; 428/366; 264/8, 65, 319, 332; 106/55; 65/6–8, 2, 4 R, 9, 32, 30 R

[56] References Cited

U.S. PATENT DOCUMENTS

| | | | |
|---|---|---|---|
| 2,888,325 | 5/1959 | Taylor | 423/290 |
| 3,429,722 | 2/1969 | Economy et al. | 106/55 |
| 3,816,242 | 6/1974 | Selover et al. | 162/157 R |
| 3,837,997 | 9/1974 | Economy et al. | 428/366 |
| 4,075,276 | 2/1978 | Economy et al. | 264/332 |
| 4,125,450 | 11/1978 | Degueldre | 204/296 |
| 4,130,631 | 12/1978 | Hamilton | 423/290 |

*Primary Examiner*—Peter Chin
*Attorney, Agent, or Firm*—John L. Sniado; Anthony M. Lorusso

[57] ABSTRACT

A process is disclosed for producing a non-woven boron nitride (BN) fiber felt. Boron nitride fibers are blended with a lesser amount of boron oxide fibers and a nondissolving, anhydrous liquid medium to form a homogeneous slurry. The slurry is deposited on the moving screen of a Fourdrinier machine where the liquid content is gradually reduced until sufficient fiber to fiber contact is made to provide internal cohesiveness, to form a felt. The felt may be further treated by heating it in an anhydrous gas atmosphere at a sufficient temperature to soften the boron oxide binder to fuse the BN fibers together, and then converting the interstitial boron oxide into boron nitride. The resulting boron nitride-bonded boron nitride felt may be used as an electric cell separator in a lithium sulfide battery.

4 Claims, 2 Drawing Figures

PROCESS FOR MANUFACTURING BORON NITRIDE FIBER FELT USING A FOURDRINIER MACHINE

BACKGROUND OF THE INVENTION

The invention relates generally to boron nitride fibers and more particularly to a process for producing integral boron nitride fiber felt.

Boron nitride (BN) possesses a number of highly desirable properties which render it useful in a wide variety of applications. Its high electrical resistivity, coupled with its high thermal conductivity, make it especially useful in electrical and electronic applications requiring a material which simultaneously acts as an electrical insulator and a thermal conductor. Its excellent thermal shock resistance renders it effective as a refractory at temperatures up to 1600° C. or higher in a non-oxidizing atmosphere and at temperatures as high as 700° to 900° C. in air. It is highly corrosion resistant, being inert to most organic liquids and many corrosive chemicals and displaying excellent resistance to attack by various molten metals. Furthermore, because of its low dissipation factor over a wide temperature range, this material is well suited for use in microwave and radar dielectric components (radar windows).

Various methods for the manufacture of boron nitride fibers are known in the prior art; for example, it is disclosed in U.S. Pat. No. 3,429,722, issued to James Economy et al., that boron nitride fibers can be manufactured by heating boron oxide ($B_2O_3$) fibers in an ammonia atmosphere, a process known generally as nitriding.

While it is well known in the prior art that boron nitride fibers can be manufactured having good characteristics, the use of such fibers has been limited due to difficulties in forming three dimensional articles from the fibers. U.S. Pat. No. 3,816,242 to Selover et al. teaches a process for binding BN fibers into a felt using an aqueous solution of an inorganic, water soluble material as the binder. However, almost any substance other than BN which is used to bond the fibers to each other has properties which are inferior to the properties of the boron nitride fibers, thus resulting in a bonded article which is unsuitable for use in many applications. For example, when a boron nitride fiber mat, which is bound by prior art materials, is used as an electric cell separator in a lithium sulfide battery utilizing a corrosive cell electrolyte, such as molten lithium chloride or potassium chloride, the fibers separate from each other due to the inability of the binding material to withstand the high temperature corrosive environment.

An attempt has been made prior to the present invention to form articles of boron nitride-bonded boron nitride fibers, for example, by heating boron nitride fibers impregnated with boric acid solution to elevated temperatures in ammonia as disclosed in U.S. Pat. No. 3,837,997 to James Economy et al.

In addition to the above-noted references relating to boron nitride fibers, shaped boron nitride, usually non-porous, bodies have also been prepared in the past. Such articles are disclosed, for example, by Taylor, U.S. Pat. No. 2,888,325, which teaches the use of a multiple stage nitriding process comprising intermittent addition of oxygen-containing boron compound at intermediate stages of nitriding, followed by further nitriding.

U.S. Pat. No. 4,125,450 suggests that battery separators may be manufactured using conventional papermaking techniques. However, the adaptation of a Fourdrinier paper machine, or other papermaking apparatus, to the processing of boron nitride fibers, so as to yield an acceptable finished sheet appears to be unknown to the prior art.

U.S. Pat. No. 4,130,631, assigned to the same assignee as the present application, does disclose a method for producing a non-woven porous boron nitride fiber mat having sufficient strength for use as an electric cell separator in the above mentioned molten lithium chloride environment. However, despite the superior physical characteristics of the resulting product, this method has not been found to be an economically feasible operation.

Therefore it is an object of the present invention to adapt techniques from the papermaking art to the economical production of boron nitride articles.

It is a further object of the present invention to produce boron nitride fiber articles of consistent quality on a large quantity basis.

SUMMARY OF THE INVENTION

A process for producing a boron nitride fiber felt comprises the steps of blending boron nitride fibers and boron oxide fibers with a nonaqueous liquid medium to form a homogeneous slurry. The slurry is distributed in an essentially uniform layer upon the moving screen of a Fourdrinier machine and a plurality of vacuum boxes disposed beneath the slurry-supporting surface of the screen suctions essentially all of the liquid medium from the slurry layer to allow sufficient fiber to fiber contact to produce bonding among the fibers.

In a preferred embodiment, staple boron nitride fibers having a length of from 0.1 inch to 1.0 foot are blended with boron oxide fibers in the ratio of 50–99% by weight of boron nitride fibers and 1–50% by weight of boron oxide fibers, using a Freon (a Trademark of E. I. duPont de Nemours and Company) liquid as the suspending medium.

BRIEF DESCRIPTION OF THE DRAWINGS

The several features and advantages of this process for manufacturing boron nitride felt in accordance with the invention, will be more readily understood and appreciated from the following detailed description of the preferred embodiments, as shown in the accompanying drawings in which.

DESCRIPTION OF THE PREFERRED EMBODIMENT

Figure 1:
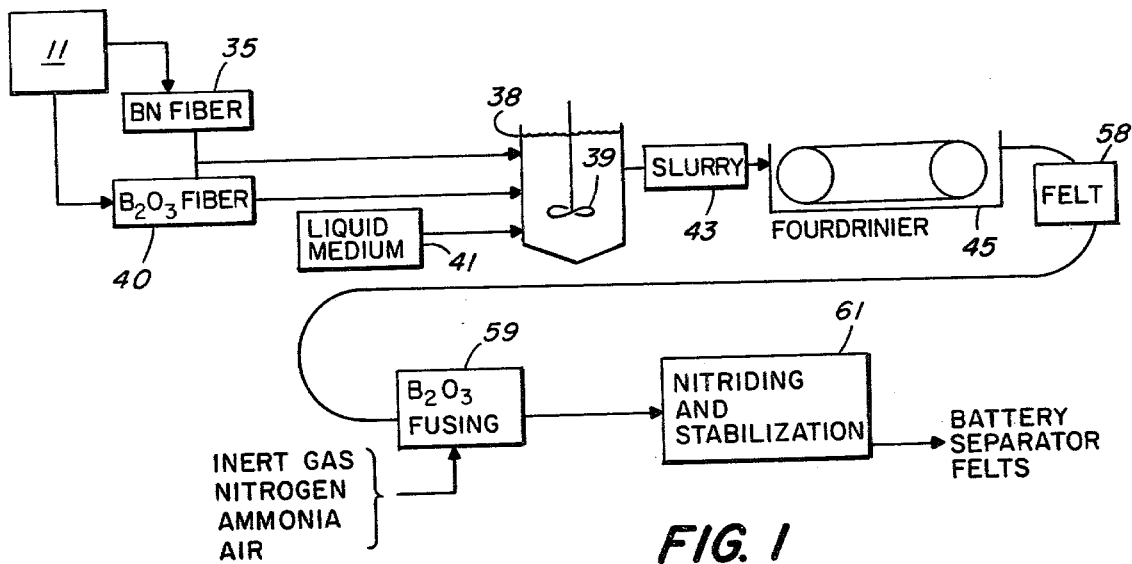
FIG. 1 is a flow diagram of the boron nitride felt manufacturing process.

Referring now to FIG. 1, the starting point in the boron nitride felt manufacturing process, is the production of the constituent boron nitride and boron oxide fibers indicated by reference numeral 11.

The particular mechanism by which the fibers are produced is not critical to the practice of the present invention. Preferably both the fully nitrided BN fibers and the boron oxide ($B_2O_3$) fibers should have a maximum diameter of about 10 microns, with 3–7 microns being the optimum diameter range, and lengths of from about 0.1 inch to 1.0 foot. A particularly suitable method for producing these fibers is disclosed in a copending U.S. patent application Ser. No. 134,905, filed on even date herewith, by the same inventors for PROCESS FOR MANUFACTURING BORON NITRIDE FIBER BATTS USING A SPINNER, the teachings of which are incorporated herein by reference. In this process molten $B_2O_3$ is centrifugally extruded into strands which are attenuated into staple $B_2O_3$ fibers by an annular stream of gases. The fibers are compacted into bundles for ease of handling. The $B_2O_3$ within the fiber bundles can be converted into BN by heating them in an anhydrous ammonia atmosphere for a sufficient time, a procedure described in more detail in U.S. Pat. No. 3,429,722, and hereby incorporated by reference.

Referring again to FIG. 1, the BN fibers 35 are introduced into a blending apparatus 38 in which an agitating member 39 blends them with a smaller amount of pure boron oxide fibers 40, preferably in a ratio of 50-99% by weight of BN fibers and 1-50% by weight of $B_2O_3$ fibers and a nonaqueous liquid medium 41 to produce a homogeneous suspension of the fibers within the fluid, commonly known as a slurry. The medium 41 used is one which does not have a dissolving effect on either of the fibers, and in which there are no traces of water. Fluids such as, for example, kerosene, propanol, benzene and various liquid fluorocarbons known by the broad term Freon (a trademark of the E. I. duPont de Nemours Company) may be used as the medium. Freon TF ($CCl_2F$—$CClF_2$) has been proven to be the preferred liquid for this operation. Typically, after blending, the percentage of solids suspended within the Freon medium is in the range of from 0.01% to 1.0% by weight.

Figure 2:
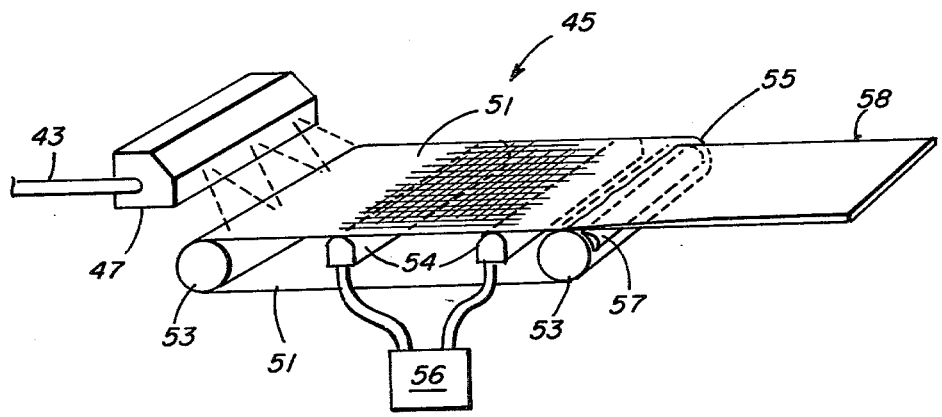
FIG. 2 is a side perspective view, in a diagrammatic form, of the Fourdrinier machine used to produce the boron nitride felt.

A pipeline or conduit 43 conveys the slurry to a Fourdrinier machine 45, an apparatus well known in the papermaking art. Referring now to FIG. 2, the pipeline 43 delivers the slurry to a headbox 47 of the Fourdrinier machine 45. The headbox 47 has the same width as a screen 51 so that the slurry flows onto the continuous screen 51 in a uniformly thick layer. The screen is supported and driven in an endless loop by rollers 53, which are driven by an external source (not shown). For best results the speed of the screen should be in the range of from 1.0 to 100 feet per minute.

The flow rate of the slurry within the headbox (controlled by a variable speed pump, not shown) must be adjusted, depending on such factors as, for example, the concentrations of the fibers within slurry, the depth of the slurry, and the speed of the screen, to insure that the fibers are traveling at about the same speed as the screen at the point of impact thereon. This allows a portion of the fibers within the slurry to orient themselves in a direction transverse to the movement of the screen, to enhance the tensile strength of the resultant fiber mat in this direction. Too great a differential between the speeds of the fibers and the speed of the screen causes all the fibers to align themselves in the direction of the screen movement, resulting in a reduction in transverse tensile strength.

Located beneath the porous screen 51 are a succession of vacuum boxes 54 whose function is to draw the liquid (Freon) carrier from the slurry to reduce its liquid content. By the time the slurry has reached the righthand or forwardmost end 55 of the screen, the percentage of solids within the slurry has increased from the initial 0.01-1.0% to a final value of about 100%. As the fluid content decreases, fiber to fiber contact increases. What remains is a homogeneous mat of intertwined boron nitride fibers with interstitially located boron oxide binder fibers. Thus, the slurry gradually and successively dries into an internally cohesive felt.

The amount of suction provided by the vacuum boxes generally is about $-1.0$ atmosphere, and six such vacuum boxes typically are needed for adequate drying. A heating element of some type may be used in conjunction with the vacuum boxes to improve drying of the slurry through evaporation. However, if evaporation is used as an adjunct, an adequate recovery system must be used to prevent needless waste of the liquid, especially with a fluid as expensive as Freon. Each of the vacuum boxes 54 delivers its recovered liquid to a central reservoir 56, so the liquid can be reused.

The resulting felt 58, in the form emerging from the Fourdrinier machine, can be fashioned by any well-known technique into a variety of shapes and sizes suitable for specific applications. However, if additional internal strength is required for a particular purpose, the felt can be heated in an anhydrous gas selected from the group consisting of inert gases, nitrogen, ammonia, air, and mixtures thereof to a temperature above the 460° C. melting temperature of the boron oxide binder for a time sufficient to fuse at least some of the boron oxide to the BN fibers. This operation is indicated in FIG. 1 by reference numeral 59. Generally, the heating temperature is from about 460° to about 1,400° C. Such a treatment generally improves the tensile strength of the felt from an initial value in the range of 0.01 to 1.0 psi to a final value of 11 to 30 psi.

Since the felt, even with the additional heating and fusing step, is a boron oxide-bonded boron nitride material, the boron oxide binder may deteriorate if exposed to certain corrosive environments, most notably the lithium chloride or potassium chloride electrolyte of a lithium sulfide battery. Therefore the felt must undergo additional treatment to be acceptable for use as a battery cell separator. In particular the felt must undergo a final nitriding and stabilization phase 61 (see FIG. 1) to convert the interstitial boron oxide binder material into boron nitride. In the case of the preferred embodiment, using a slurry containing 50-99% (by weight) of fully nitrided boron nitride fibers with 1-50% (by weight) of boron oxide fibers, the felt is heated at a final nitriding temperature from about 200° C. to 900° C. for about 2 to 72 hours to convert essentially all of the boron oxide into boron nitride. The flow of $NH_3$ through the reaction chamber is maintained at 0.01 to 3.3 liter/min/gram of $B_2O_3$ fiber in the mat. For stabilization purposes, and to enhance the corrosion resistance of the finished mat, as disclosed more fully in the above referenced U.S. Pat. No. 3,429,722 patent, the fully nitrided mat can be heated in an inert atmosphere at a temperature which may be below, but which is usually above, the final nitriding temperature. For example, heating in a dry nitrogen ($N_2$) atmosphere at a temperature in the range from 1600° to 2300° C. will adequately stabilize the fibers and increase their corrosion resistance.

Although in the preferred embodiment fully nitrided boron nitride fibers are blended with additional boron oxide binder into a slurry, the BN fibers alternatively could be only partially nitrided, and the remaining nitride conversion could occur later during the above-mentioned final nitriding and stabilization phase, with appropriate adjustments to the operating temperatures and time durations. With this in mind, the present process also can be practiced using the following types of fibers within the slurry: fully nitrided boron nitride fibers and unreacted boron oxide fibers; partially nitrided boron nitride fibers and boron oxide fibers; combinations of the above with or without fillers.

Although the foregoing disclosure illustrates the advantages and features of the novel manufacturing process in accordance with the present invention, it may be obvious to those skilled in the art to effect various modifications or changes to the present invention, without departing from the spirit thereof. The scope of the present invention is to be determined by the following claims.

We claim:

1. A process for producing boron nitride-bonded boron nitride fiber mats, comprising the steps of:

blending boron nitride fibers and boron oxide fibers in a ratio by weight of about 50–99% of boron nitride fibers and about 1–50% of boron oxide fibers, said fibers having a length of from about 0.1 inch to about 1.0 foot, with $CCl_2F$—$CClF_2$ to form a homogeneous slurry;

distributing said slurry in an essentially uniformly thick layer upon the moving screen of a Fourdrinier machine;

suctioning essentially all of said Freon from said slurry-supporting surface of said screen, yielding a boron nitride and boron oxide fiber felt;

heating said felt in an anhydrous gas selected from the group consisting of inert gases, nitrogen, ammonia, air, and mixtures thereof, to a sufficient temperature to fuse said boron oxide fibers to said boron nitride fibers; and heating the fused felt in an anhydrous ammonia atmosphere to a sufficient temperature, and for a sufficient time to convert essentially all boron oxide in the fibers to boron nitride.

2. The process as set forth in claim 1, wherein said sufficient temperature to convert the boron oxide to boron nitride is from about 200° C. to about 900° C., and said sufficient time to convert the boron oxide to boron nitride is from about 2 to about 72 hours.

3. The process as set forth in claim 1, wherein said sufficient temperature to fuse said boron oxide fibers to said boron nitride fibers is from 460° C. to 1,400° C.

4. The process as set forth in claim 1, wherein said moving screen is moving at a speed of from about 1.0 to 100 feet per minute.

* * * * *